(12) United States Patent
Cagle

(10) Patent No.: US 10,584,956 B2
(45) Date of Patent: *Mar. 10, 2020

(54) LASER MEASURING SYSTEM FOR MOTORCYCLE FRAME REPAIR

(71) Applicant: Allen Cagle, Folsom, CA (US)

(72) Inventor: Allen Cagle, Folsom, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/648,698

(22) Filed: Jul. 13, 2017

(65) Prior Publication Data

US 2017/0307357 A1 Oct. 26, 2017

Related U.S. Application Data

(63) Continuation of application No. 14/727,529, filed on Jun. 1, 2015, now Pat. No. 9,733,065, which is a continuation-in-part of application No. 13/839,542, filed on Mar. 15, 2013, now Pat. No. 9,073,109.

(60) Provisional application No. 61/639,901, filed on Apr. 28, 2012.

(51) Int. Cl.
| | |
|---|---|
| *G01B 11/02* | (2006.01) |
| *B25H 1/00* | (2006.01) |
| *G01B 5/00* | (2006.01) |
| *G01B 11/24* | (2006.01) |
| *B21D 1/14* | (2006.01) |

(52) U.S. Cl.
CPC .......... *G01B 11/02* (2013.01); *B25H 1/0014* (2013.01); *G01B 5/0025* (2013.01); *G01B 11/24* (2013.01); *B21D 1/14* (2013.01); *Y10T 29/49618* (2015.01)

(58) Field of Classification Search
CPC ........ G01B 11/02; G01B 11/24; G01B 5/0025
USPC .......................... 33/288, 608; 73/31.02, 705
See application file for complete search history.

(56) References Cited

U.S. PATENT DOCUMENTS

| | | | |
|---|---|---|---|
| 3,000,102 A | 9/1961 | Snyder |
| 3,562,773 A | 2/1971 | Wilamowski |
| 4,015,339 A | 4/1977 | Horvallius |
| 4,088,002 A | 5/1978 | Andrew |
| 4,432,144 A | 2/1984 | Carlsson |
| 4,603,570 A | 8/1986 | Dehn |
| 4,615,618 A | 10/1986 | Bailey |
| 4,621,435 A | 11/1986 | Higginbotham |
| 4,691,443 A | 9/1987 | Hamilton |

(Continued)

FOREIGN PATENT DOCUMENTS

| | | |
|---|---|---|
| DE | 19810140 A1 | 3/1998 |
| EP | 0458268 A2 | 5/1991 |

(Continued)

OTHER PUBLICATIONS

The International Search Report and Written Opinion of the International Searching Authority, or the Declaration for PCT Application No. PCT/US18/33015 dated Aug. 7, 2018.

(Continued)

*Primary Examiner* — Christopher W Fulton
(74) *Attorney, Agent, or Firm* — Haverstock & Owens LLP

(57) ABSTRACT

A motorcycle frame rack enables a motorcycle frame to be repaired without removing many components from the motorcycle. A motorcycle is positioned on the motorcycle frame rack, secured in place and then the frame is adjusted using chains coupled to towers. A self-centering laser measuring system is able to be used to analyze and measure damage to the motorcycle frame.

22 Claims, 18 Drawing Sheets

(56) References Cited

U.S. PATENT DOCUMENTS

| | | |
|---|---|---|
| 4,731,931 A | 3/1988 | Goodman |
| 4,731,936 A | 3/1988 | Aldrich |
| 4,843,720 A | 7/1989 | Kim |
| 4,997,283 A | 3/1991 | Danielson |
| 5,027,524 A | 7/1991 | Metcalf et al. |
| 5,029,397 A | 7/1991 | Palombi |
| 5,038,493 A | 8/1991 | Stabs |
| 5,125,164 A | 6/1992 | Fournier et al. |
| 5,175,941 A | 1/1993 | Ziegler |
| 5,417,094 A | 5/1995 | Chisum |
| 5,507,101 A | 4/1996 | Mason |
| 5,509,208 A | 4/1996 | Oja |
| 5,515,613 A | 5/1996 | Hinson |
| 5,644,854 A | 7/1997 | Bergeron |
| 5,647,139 A | 7/1997 | Richardson |
| 5,931,360 A | 8/1999 | Reichert |
| 6,240,648 B1 | 6/2001 | Dolph |
| 6,347,457 B1 | 2/2002 | Espinoza |
| 7,059,060 B1 | 6/2006 | Baumgartner |
| 7,120,524 B2 | 10/2006 | Srack |
| 7,600,408 B2 | 10/2009 | Potter et al. |
| 7,874,080 B1 | 1/2011 | Morales |
| 8,763,269 B2 | 7/2014 | Buckland |
| 9,073,109 B2 | 7/2015 | Cagle |
| 9,428,923 B1 | 8/2016 | Christner |
| 9,694,406 B2 | 7/2017 | Cagle |
| 9,733,065 B2 | 8/2017 | Cagle |
| 10,022,777 B2 * | 7/2018 | Cagle ............ B25H 1/0014 |
| 2002/0051703 A1 | 5/2002 | Clary |
| 2002/0062677 A1 | 5/2002 | Ballard |
| 2002/0088128 A1 | 7/2002 | Bremer |
| 2005/0235731 A1 | 10/2005 | Hess |
| 2008/0148798 A1 | 6/2008 | Weschler |
| 2009/0249632 A1 | 10/2009 | Tyler et al. |
| 2009/0322006 A1 | 12/2009 | Potter |
| 2011/0113640 A1 | 5/2011 | Molina |
| 2013/0283876 A1 | 10/2013 | Cagle |
| 2013/0286405 A1 | 10/2013 | Cagle |
| 2015/0260508 A1 | 9/2015 | Cagle |
| 2017/0312807 A1 | 11/2017 | Cagle |

FOREIGN PATENT DOCUMENTS

| | | |
|---|---|---|
| EP | 0846944 A1 | 6/1998 |
| EP | 0945333 B1 | 9/1999 |

OTHER PUBLICATIONS

International Preliminary Report on Patentability from PCT Application No. PCT/US2016/035339, dated Dec. 14, 2017.
Lopez, Ernie; "Back on the Road", Jun. 2005, Hot Bike, vol. 37 No. 6, pp. 66-72.
Office Action from U.S. Appl. No. 13/839,293, dated Jan. 14, 2015.
Office Action from U.S. Appl. No. 13/839,293, dated Apr. 27, 2015.
Office Action from U.S. Appl. No. 13/839,293, dated Aug. 25, 2015.
International Preliminary Report for PCT Application No. PCT/US2018/33015 dated Nov. 28, 2019.

* cited by examiner

This Point Lower is Universal Straight Shooter

LASER MEASURING SYSTEM FOR MOTORCYCLE FRAME REPAIR

CROSS-REFERENCE TO RELATED APPLICATION(S)

This application is a continuation application of U.S. patent application Ser. No. 14/727,529 (now U.S. Pat. No. 9,733,065), filed Jun. 1, 2015 and titled LASER MEASURING SYSTEM FOR MOTORCYCLE FRAME REPAIR, which is a continuation-in-part application of U.S. patent application Ser. No. 13/839,542 (now U.S. Pat. No. 9,073,109), filed Mar. 15, 2013, and titled "SELF-CENTERING LASER MEASURING SYSTEM FOR MOTORCYCLE FRAME REPAIR," which claims priority under 35 U.S.C. § 119(e) of the U.S. Provisional Patent Application Ser. No. 61/639,901, filed Apr. 28, 2012 and titled, "MOTORCYCLE FRAME RACK," which are all hereby incorporated by reference in their entireties for all purposes.

FIELD OF THE INVENTION

The present invention relates to the field of motorcycles. More specifically, the present invention relates to motorcycle repair.

BACKGROUND OF THE INVENTION

Until the mid 1970's, if a car was in an accident and sustained frame damage, the car was deemed a "total" economical loss by the insurance companies. They totaled the cars because the technology, equipment and information and training were not yet available to repair shops. That has all changed. By the mid 1980's most reputable body shops had a frame rack.

Representatives from various insurance companies are becoming frustrated with totaling motorcycles without knowing for sure how badly the frames are bent, especially when they can see there is minimal frame damage.

There are only five motorcycle frame shops in all of the United States, one in Arizona and four in California.

The first two are in Sacramento and Anaheim. These two shops use what is known as a peg board system. This system requires the motorcycle to be stripped down. This procedure requires several hours of labor, and they cannot provide documentation, before and after specifications or show the customer a print out that the frame is straight. This is a problem for the insurance companies. They want documentation for their records for any repairs that were performed. Another problem is these two shops require approximately eight weeks before a user gets the motorcycle back.

The other shops are located in San Bruno and Englewood, Calif. and one in Arizona. The equipment they use is called a Motojig. This is a "bench" system made in Italy which is an old and antiquated automobile frame rack in which the motorcycle has to be lifted with a hoist to be put on the "bench." It is a cumbersome, time consuming piece of equipment.

Right now, if a user's motorcycle gets hit while parked or gets involved in a motorcycle accident in California, the bike gets towed to the dealership for repairs. The dealership strips the bike down and pays to have it transported to and from one of the frame shops at a cost to the customer and/or the insurance company.

There are more men and women riding motorcycles than ever before. Some ride to commute and/or ride for economic reasons, some ride for the sport and the thrill of it, while others ride for the lifestyle. The fact of the matter is there has never been this many people riding motorcycles in the streets.

According to the National Highway Traffic Safety Administration as of Dec. 31, 2010, there are over 900,000 registered motorcycles in California alone. There are over 600,000 people a year in the United States that register for a Motorcycle safety course through the Motorcycle Safety Foundation. This is just one of the many accredited Motorcycle safety Schools in the United States. With the price of gasoline going up every other week there are more and more people riding motorcycles and not just nationwide but worldwide.

Additionally, there are thousands of people who race motorcycles all over the world. There are super sport road racers, café racers, the mile, drag racing, TT, flat track, short track, enduro, and all kinds of motor cross, super cross and dirt track races being held all over the world.

With all of these races, there are teams of mechanics and technicians with truck loads of tools and equipment for mechanical repairs and adjustments.

SUMMARY OF THE INVENTION

With the growing popularity of motorcycles and similar modes of transportation, the need for a device and method of repairing the motorcycle's frame is great. A motorcycle frame rack including universal mounting brackets to perform any motorcycle frame repair enables a technician to straighten a motorcycle frame or make a neck rake adjustment much faster and much more cheaply than replacing the frame.

In another aspect, a self-centering laser measuring device for measuring a motorcycle frame comprises a central component with a laser, a plurality of side components and one or more coupling mechanisms for coupling the plurality of side components with the central component, wherein the plurality of side components move equidistantly towards or away from the central component. The laser is rotatable. The plurality of side components each include an additional laser. The laser of the central component and the additional laser of each of the plurality of side components is configured to measure the motorcycle frame. The additional laser of each of the plurality of side components is configured to point to targets of the motorcycle frame. Each side component of the plurality of side components includes an aperture for receiving a mounting rod. The device further comprises a mounting bracket. The mounting bracket is configured for a specific motorcycle. The mounting bracket comprises a base, a central point on the base, a plurality of mounting rods and a plurality of spacers. The one or more coupling mechanisms comprise a first bar coupled to an end of a first side component of the plurality of side components, wherein the first bar passes through the central component and a second side component of the plurality of side components and a second bar coupled to an end of the second side component of the plurality of side components, wherein the second bar passes through the central component and the first side component of the plurality of side components.

In another aspect, a self-centering laser measuring device comprises a universal mounting laser device configured for measuring a motorcycle frame and a mounting bracket configured for coupling to a motorcycle. The universal mounting laser device comprises a central component with a laser, a plurality of side components and one or more coupling mechanisms for coupling the plurality of side components with the central component, wherein the plurality of side components move equidistantly towards or away from the central component. The laser is rotatable. The plurality of side components each include an additional laser. The laser of the central component and the additional laser of each of the plurality of side components is configured to measure the motorcycle frame. The additional laser of each of the plurality of side components is configured to point to targets of a motorcycle frame. Each side component of the plurality of side components includes an aperture for receiving a mounting rod. The mounting bracket is configured for a specific motorcycle. The mounting bracket comprises: a base, a central point on the base, a plurality of mounting rods and a plurality of spacers. The one or more coupling mechanisms comprise: a first bar coupled to an end of a first side component of the plurality of side components, wherein the first bar passes through the central component and a second side component of the plurality of side components and a second bar coupled to an end of the second side component of the plurality of side components, wherein the second bar passes through the central component and the first side component of the plurality of side components.

In another aspect, a method of utilizing a self-centering laser measuring system comprises mounting a mounting bracket to a motorcycle, aligning a universal mounting laser device with a center point of the mounting bracket, coupling the universal mounting laser device to the mounting bracket and using one or more lasers of the universal mounting laser device to analyze the motorcycle frame. Mounting the mounting bracket to the motorcycle includes mounting the mounting bracket to mounting points under a seat of the motorcycle. Coupling the universal mounting laser device to the mounting bracket is by inserting mounting rods of the mounting bracket into mounting holes of the universal mounting laser device. Using the one or more lasers of the universal mounting laser device to analyze the motorcycle frame includes measuring defects in the motorcycle frame. Using the one or more lasers of the universal mounting laser device to analyze the motorcycle frame includes aiming the lasers at targets of the motorcycle frame. The method further comprises adjusting the motorcycle frame with a rack. The method further comprises using the one or more lasers of the universal mounting laser device to re-analyze the motorcycle frame to ensure any damage has been corrected.

DETAILED DESCRIPTION OF THE PREFERRED EMBODIMENT

A motorcycle frame rack (also referred to as the "rack") generally includes one or more towers, a tool board with a universal mounting system and a ramp. In some embodiments, the rack has two towers with ten tons of pulling capability per tower. The pulling capability of the towers is able to be less or greater depending on the need. The universal mounting system mounts and holds steady any make or model motorcycle for frame repair. The ramp is able to be any type of ramp. Examples of ramps include an aluminum ramp or a carbon fiber ramp which are sturdy yet light enough to be picked up and stored when not in use. A dolly and wench system is able to be included to pull a severely damaged motorcycle onto the rack. Any pump is able to operate the two ten ton towers, for example, an electric or hydraulic pump. The rack is able to include a measuring system including a computing device and a printer. The measuring system is able to provide an operator with before and after frame specifications from any motorcycle in the world. The operator is able to measure the motorcycle frame before making the decision to remove a wrecked front end and installing the frame pulling equipment and tooling.

Once the motorcycle is on the frame rack, there are a variety of pull clamps, brackets and/or straps that are able to be used to pull the frame back to factory specifications.

In some embodiments, the rack includes a deck, stand, drop panel, two towers, a two-piece ramp, a dolly, a winch along with a clamp system with numerous tools for mounting motorcycles. There is also a laser measuring system with a rolling stand that will house a computing device, monitor, printer and additional supplies.

Figure 1:
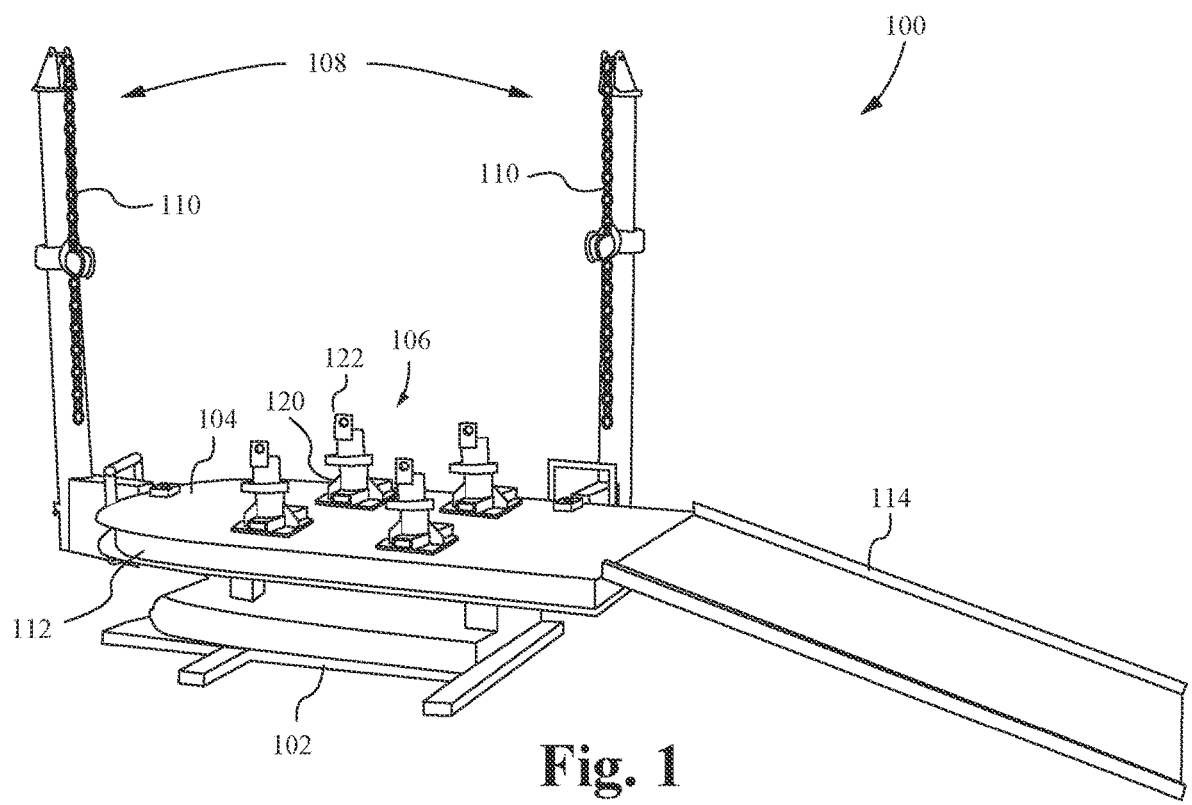
FIG. 1 illustrates a diagram of a rack according to some embodiments.

FIG. 1 illustrates a diagram of a rack according to some embodiments. The rack 100 includes a stand 102 which supports a deck 104 for receiving a motorcycle. The deck 104 includes a universal mounting system 106 for holding the motorcycle in place while the frame of the motorcycle is repaired. The universal mounting system 106 includes a universal clamp 120 and a universal mount 122. One or more towers 108 are positioned on or near the deck 102, and the towers 108 include chains 110 or another pulling mechanism such as a cable. The towers 108 are able to be positioned on a track 112 or path/guide to enable the towers 108 to be moved into a specific position to perform the adjustment of the motorcycle frame. The track 112 permits the towers to slide around the deck 104 while remaining coupled to the deck 104. The towers 108 are able to be locked into place with a locking mechanism. The towers 108 include a mechanism to provide one or more tons of pulling capability. The towers 108 are able to be operated automatically (e.g. by a computing device and/or additional electronics) or manually (e.g. using hydraulics). A ramp 114 is used to allow a motorcycle to be driven or pushed up onto the deck 104. The ramp 114 is able to couple to the deck 104.

Figure 2:
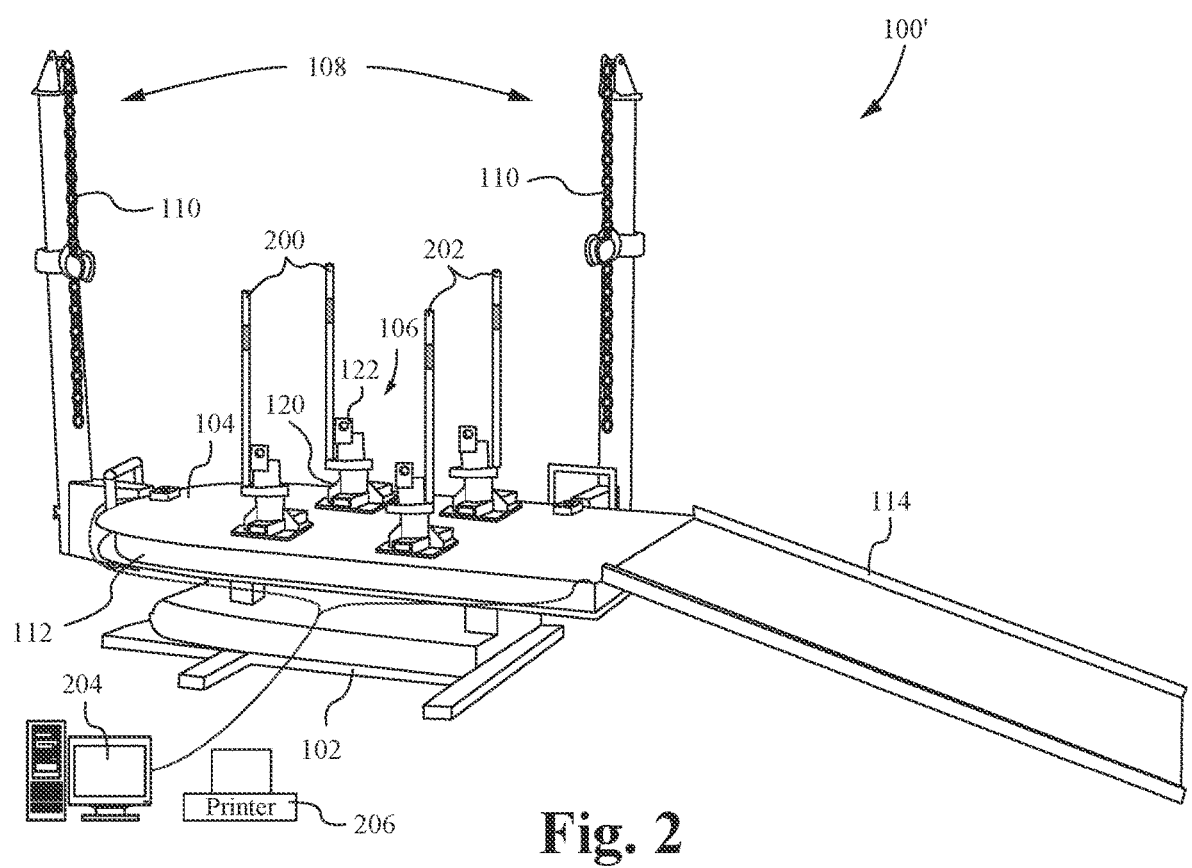
FIG. 2 illustrates a diagram of a rack including a positioning system according to some embodiments.

FIG. 2 illustrates a diagram of a rack including a positioning system according to some embodiments. The rack 100' is similar to the rack 100 of FIG. 1 in that the rack 100' includes a stand 102, a deck 104, a universal mounting system 106, one or more towers 108 with chains 110, a tower track 112 or path/guide and a ramp 114. The rack 100' also includes a measurement system. The measurement system includes a laser measuring and pointing system, a computing device 204 and a printer 206. In some embodiments, the measurement system is implemented without a computing device 204 and printer 206. The laser measuring and pointing system includes a laser transmitter 200 and a laser receiver 202, where the laser transmitter 200 transmits a laser beam and the laser receiver 202 receives the laser beam. The measurement system is able to include one or more laser measuring and pointing systems. In some embodiments, the laser transmitter 200 and the laser receiver 202 are positioned together on a single rod. In some embodiments, the laser measuring and pointing system is coupled to or part of the universal mounting system 106. In some embodiments, the laser measuring and pointing system is coupled to or part of the one or more towers 108. In some embodiments, the laser measuring and pointing system is coupled to or part of the deck 104. The laser measuring and pointing system is able to be movable. In some embodiments, the laser measuring and pointing system is a stand alone device separate from the deck 100. The computing device 204 and the printer 206 are able to include any software or hardware to implement any desired functions such as controlling the towers, analyzing the laser measuring and pointing system data, capturing data, acquiring images for reporting purposes, damage/repair calculations/analysis and any other calculations, functions or data capture/analysis.

Figure 3:
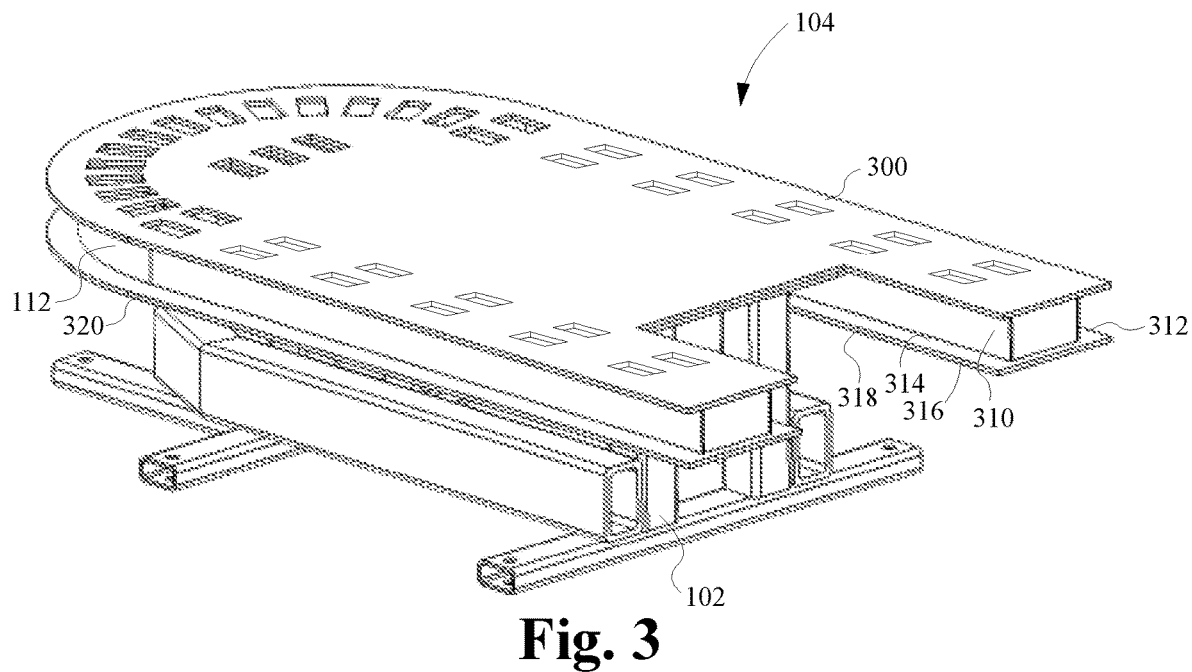
FIG. 3 illustrates a perspective view of a deck according to some embodiments.

FIG. 3 illustrates a perspective view of a deck according to some embodiments. The deck 104 includes a platform 300, several support structures 102 (FIG. 1) and the track 112. As described, the track 112 enables the towers 108 (FIG. 1) to move about the platform 300. The track 112 includes an inner lip 310 and an outer lip 312. Additionally each of the lips include a top surface 314 and a bottom surface 316. There is also an inner lip edge 318 and an outer lip edge 320. The support structures 102 (FIG. 1) are configured in a way to support the weight of the motorcycle as well as enable the repair of the motorcycle frame.

Figure 4:
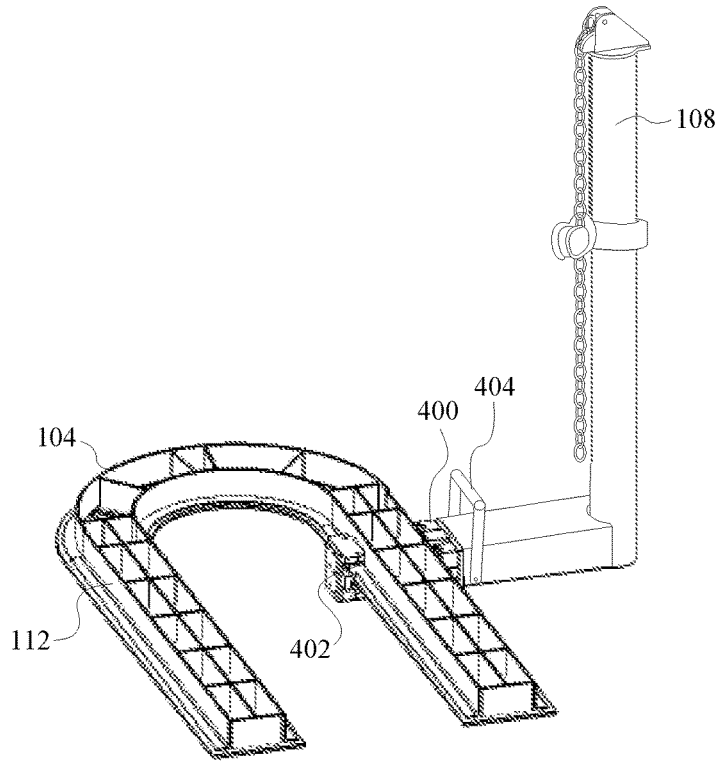
FIG. 4 illustrates a cross section view of a deck and tower according to some embodiments.

FIG. 4 illustrates a cross section view of a deck and tower according to some embodiments. The tower 108 is coupled to the deck 104 with a rolling bracket 400 that includes one or more rollers 402 and is adjustable and lockable using a lever 404. The rollers 402 permit the rolling bracket 400 to be secured to the deck 104 while also having the ability to roll to various locations on the track 112. The lever 404 is able to be used to lock the tower 108 in place. Although FIG. 4 shows a specific implementation of how the tower 108 is coupled to the deck 104, any other configurations are able to be used to couple the tower 108 to the deck 104.

Figure 5:
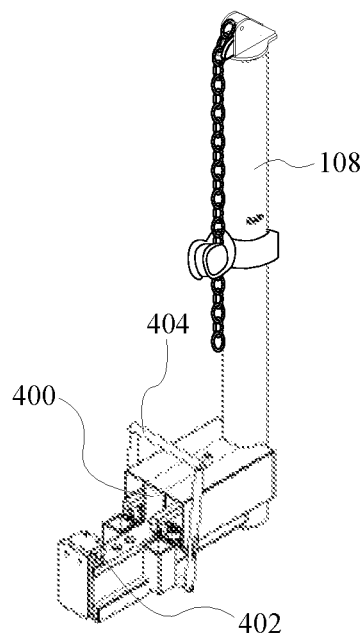
FIG. 5 illustrates a perspective view of a tower with a rolling bracket according to some embodiments.

FIG. 5 illustrates a perspective view of a tower with a rolling bracket according to some embodiments. As described in FIG. 4, the tower 108 includes the rolling bracket 400 with one or more rollers 402. The exemplary rolling bracket 400 shows rollers 402 configured to be positioned above a top surface 314 (FIG. 3) of a lip of the track 112 (FIG. 1) and below a bottom surface 316 (FIG. 3) of the lip of the track 112 (FIG. 1). Further, the rollers 402 are configured to be positioned on each of the inner lip 310 (FIG. 3) and outer lip 312 (FIG. 3) of the track 112 (FIG. 1). Additional rollers are configured to be positioned against the inner lip edge 318 (FIG. 3) and the outer lip edge 320 (FIG. 3). The rollers 402 are able to be any type of rolling mechanism such as wheels or ball bearings.

Figure 6:
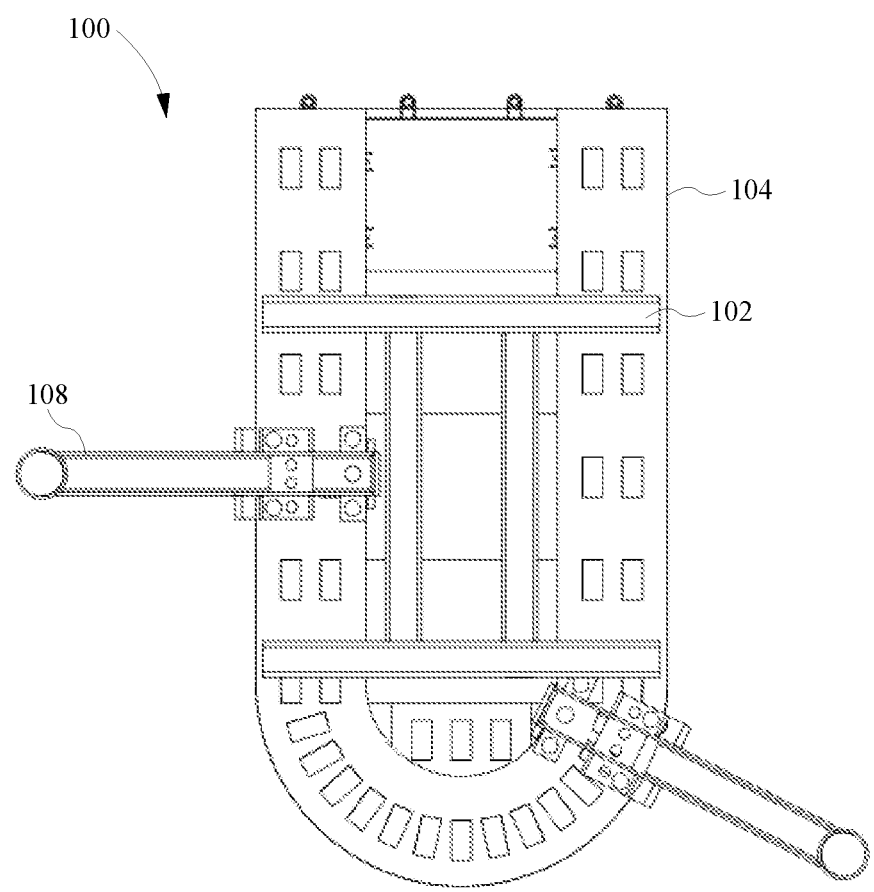
FIG. 6 illustrates a bottom view of the rack according to some embodiments.
Figure 7:
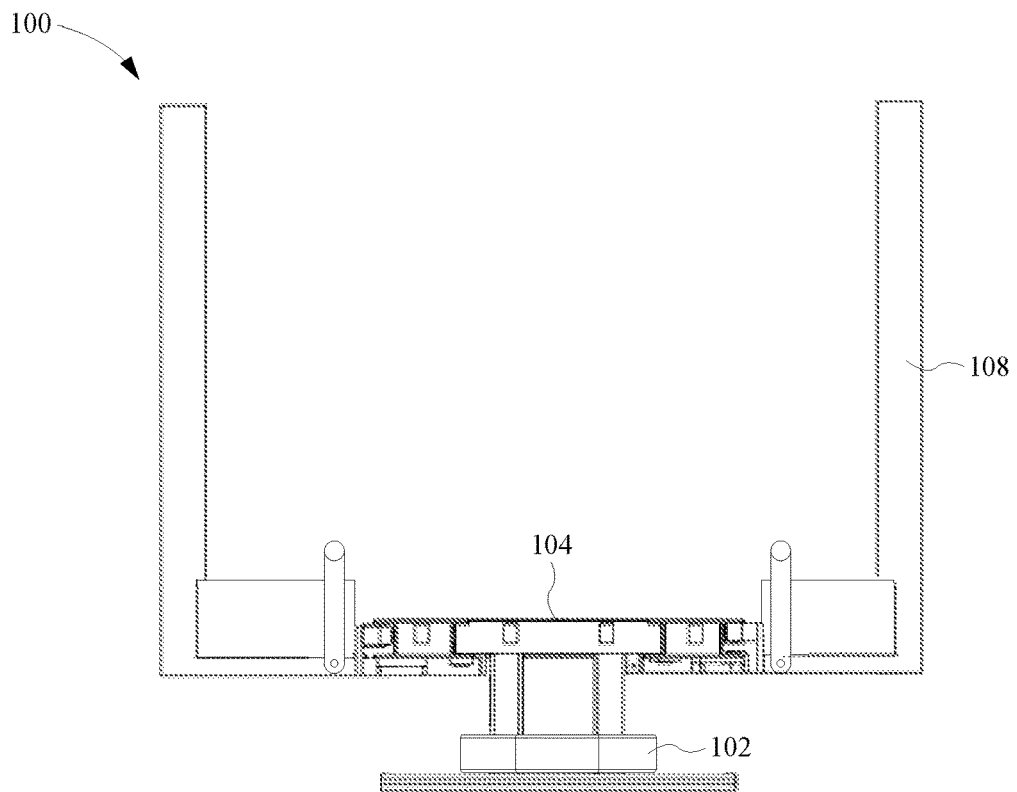
FIG. 7 illustrates a side view of the rack according to some embodiments.
Figure 8:
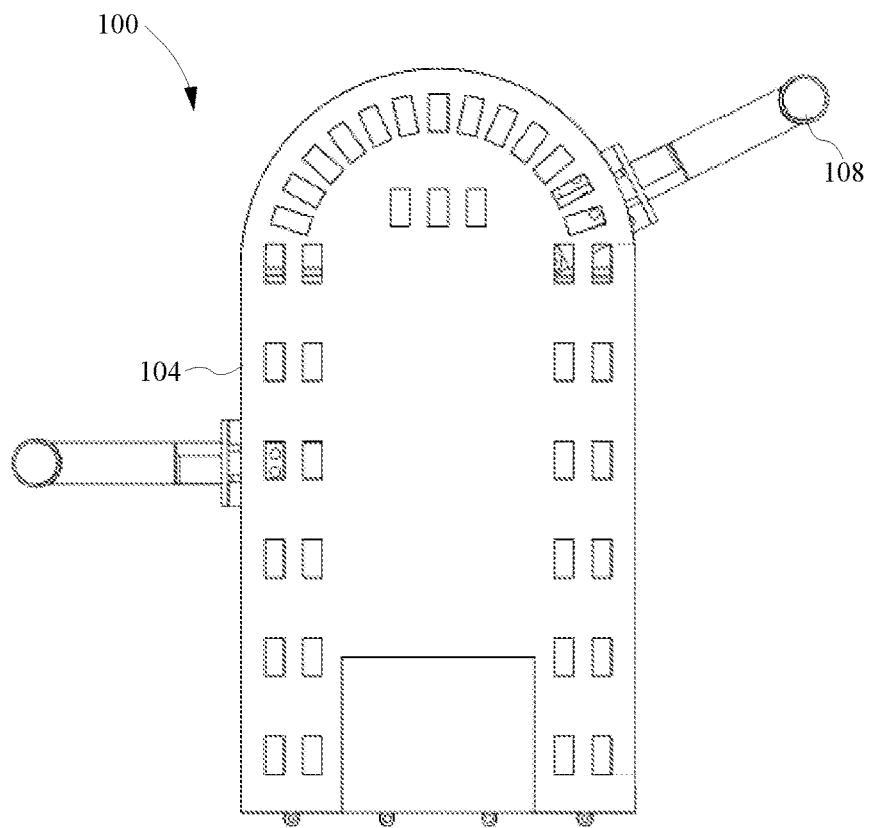
FIG. 8 illustrates a top view of the rack according to some embodiments.

FIG. 6 illustrates a bottom view of the rack according to some embodiments. As shown, the rack 100 includes the deck 104, the towers 108 and the support structure 102. FIG. 7 illustrates a side view of the rack according to some embodiments. As shown, the rack 100 includes the deck 104, the towers 108 and the support structure 102. FIG. 8 illustrates a top view of the rack according to some embodiments. As shown, the rack 100 includes the deck 104 and the towers 108.

Figure 9:
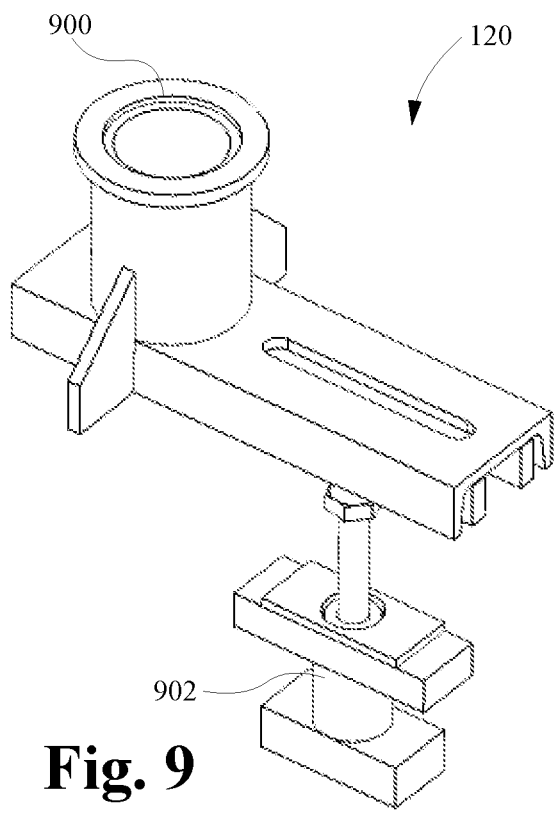
FIG. 9 illustrates a side perspective view of a clamp according to some embodiments.
Figure 10:
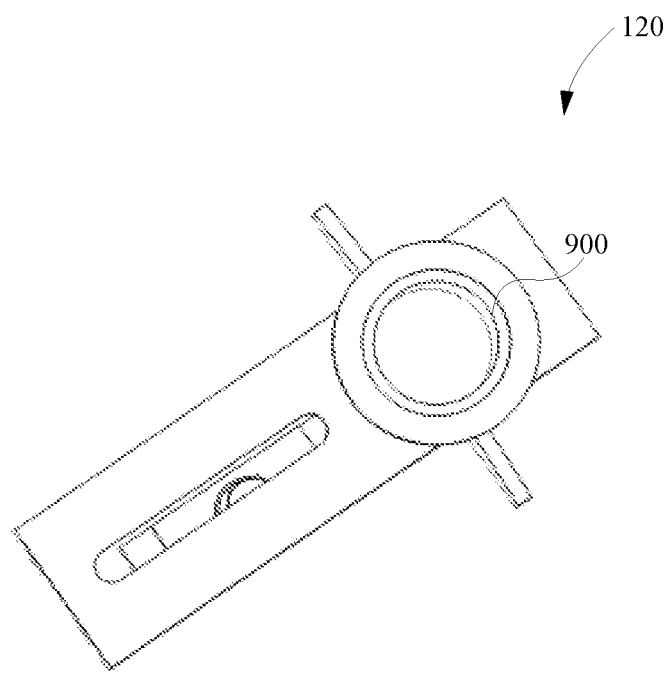
FIG. 10 illustrates a top perspective view of a clamp according to some embodiments.

FIG. 9 illustrates a side perspective view of a clamp according to some embodiments. The clamp 120 includes an aperture 900 for receiving a mount 122 (FIG. 1) and a bracket 902 for insertion into the deck 104 (FIG. 1). FIG. 10 illustrates a top perspective view of a clamp according to some embodiments. As described in FIG. 9, the clamp 120 includes an aperture 900 for receiving a mount 122 (FIG. 1).

Figure 11:
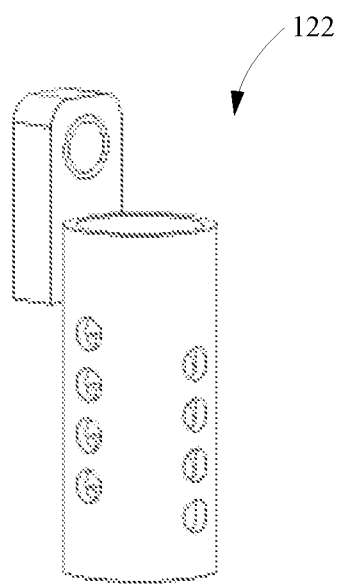
FIG. 11 illustrates a perspective view of a mount according to some embodiments.

FIG. 11 illustrates a perspective view of a mount according to some embodiments. The mount 122 is configured for insertion into the clamp 120 (FIG. 1) and for securing the motorcycle in place.

Figure 12:
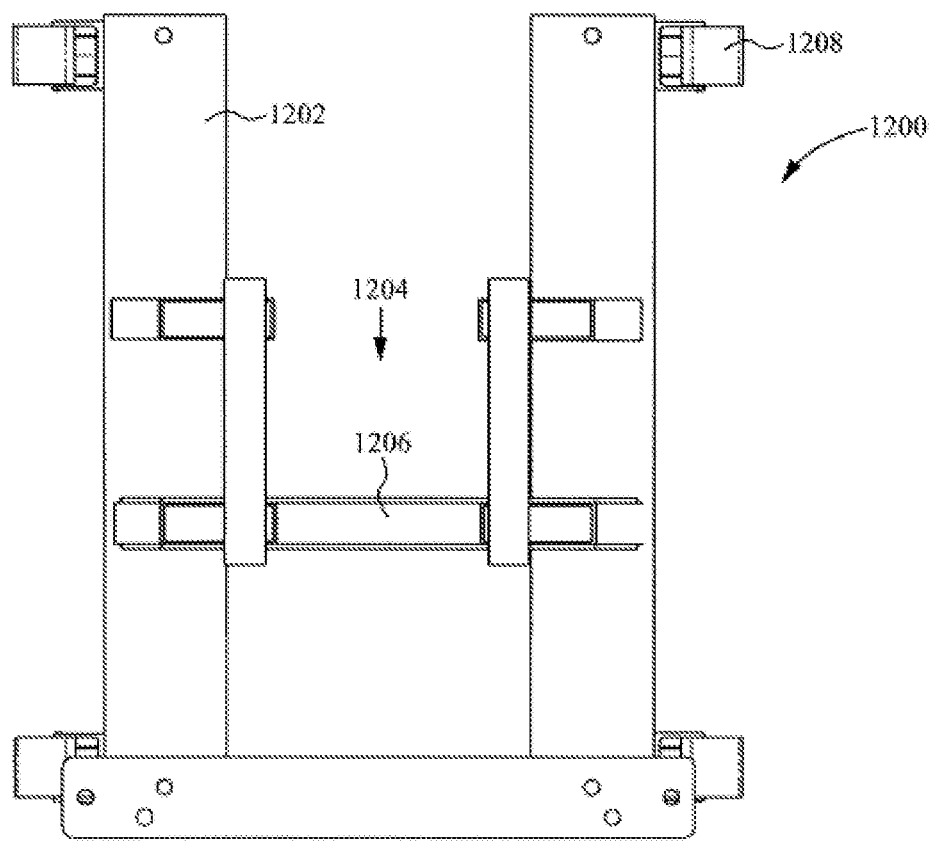
FIG. 12 illustrates a top view of a dolly according to some embodiments.
Figure 13:
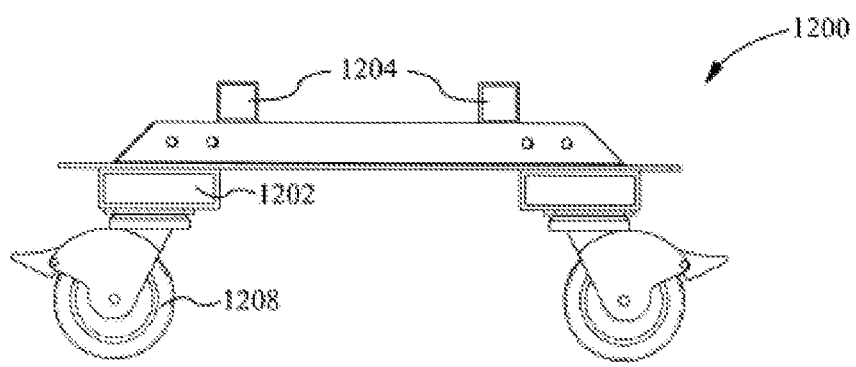
FIG. 13 illustrates a front view of a dolly according to some embodiments.
Figure 14:
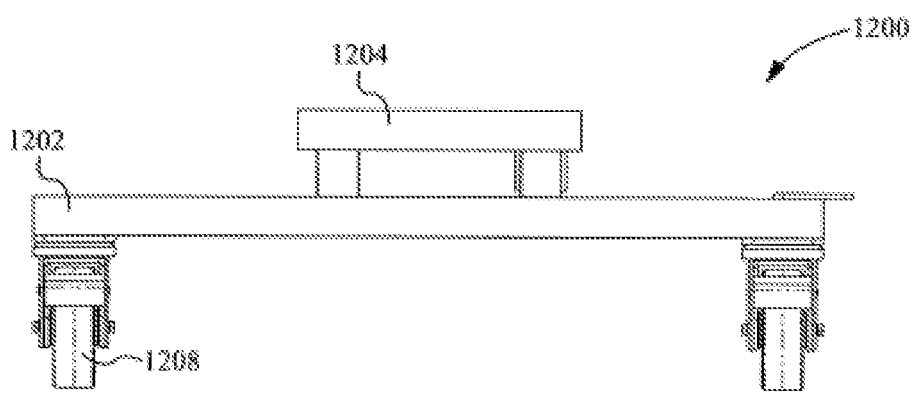
FIG. 14 illustrates a back view of a dolly according to some embodiments.

FIGS. 12-14 illustrate a dolly according to some embodiments. The dolly 1200 includes a base 1202, a top frame 1204, a brace 1206 and a set of wheels 1208. The dolly 1200 is configured to be able to be used to transport a motorcycle onto the rack 100 (FIG. 1).

Figure 15:
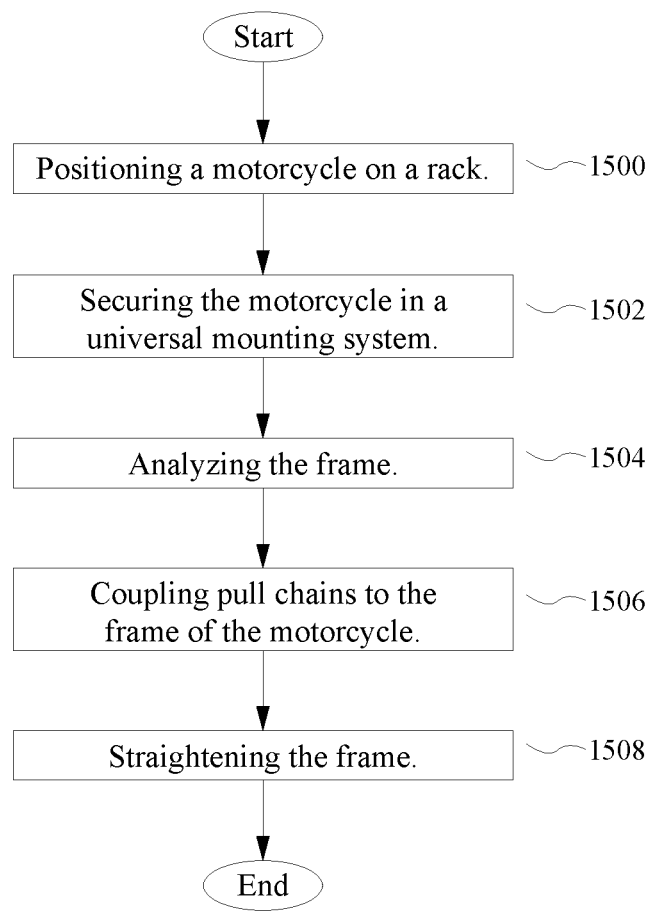
FIG. 15 illustrates a flowchart of a method of using the rack according to some embodiments.

FIG. 15 illustrates a flowchart of a method of using the rack according to some embodiments. In the step 1500, a motorcycle is positioned on the rack. Positioning is able to be by driving or pushing the motorcycle onto the rack utilizing a ramp, or using a dolly to push the motorcycle on the rack, or any other means. In the step 1502, the motorcycle is secured in the universal mounting system. The universal mounting system is able to be implemented in any manner to receive any type of motorcycle and secure the motorcycle in place to enable frame adjustment to be performed. In the step 1504, the frame of the motorcycle is analyzed with the measuring system. The analysis of the frame is able to be performed using any method including a laser measuring system which compares original specifications of the frame with measured specifications. In another implementation, the frame is analyzed using a manual tool such as a straight edge. In the step 1506, chains are coupled to the frame. The chains are coupled in an appropriate configuration based on the damage of the frame. For example, if a frame is bent such that the frame needs to be straightened slightly, the chains are positioned at either end of the frame to enable pulling of the frame which will straighten the frame. In another example, if a left arm of a frame is bent, the chains are positioned on the same arm to pull the arm appropriately. In the step 1508, the frame is adjusted using the chains. Adjusting is able to be by automatically or manually moving the towers which are coupled to the chains which then pull the frame accordingly, and/or moving the chains while keeping the towers stationary to pull the frame accordingly. In some embodiments, fewer or more steps are implemented. For example, in some embodiments, one or more parts are removed from the motorcycle before coupling the chains to the frame. In some embodiments, the order of the steps is modified.

Figure 16:
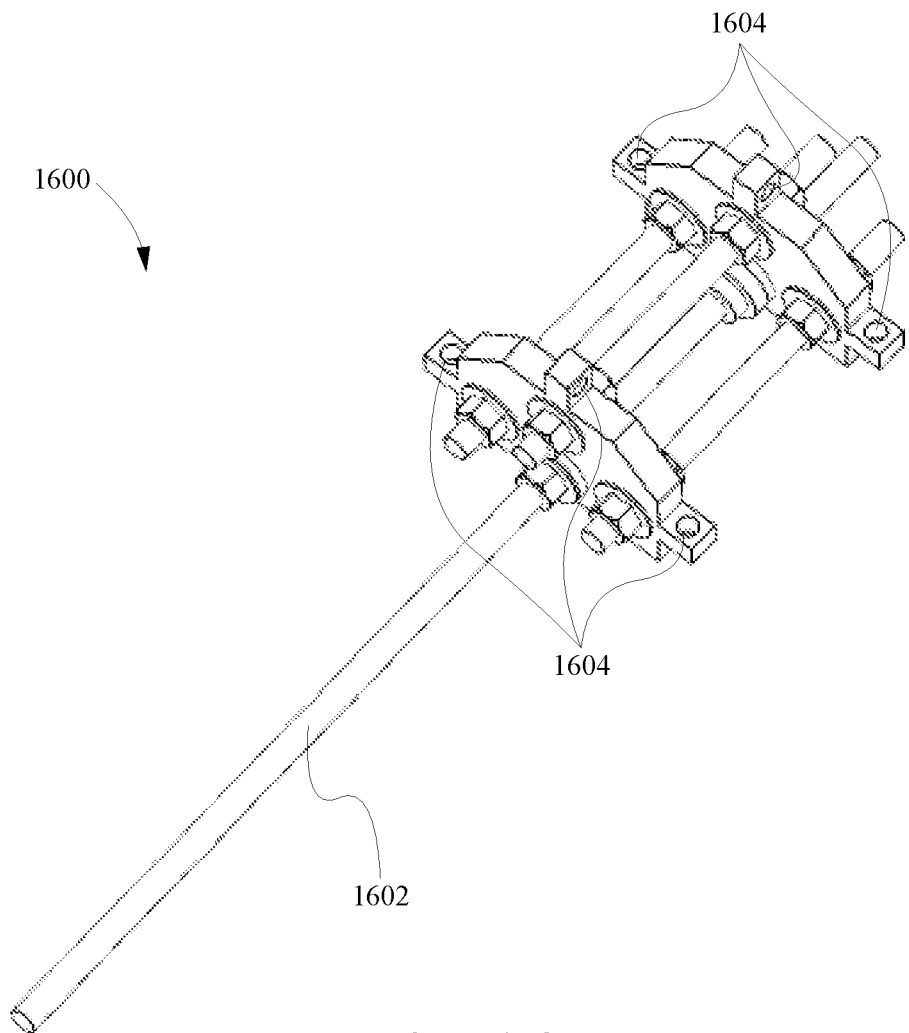
FIG. 16 illustrates a perspective view of a neck puller according to some embodiments.

FIG. 16 illustrates a perspective view of a neck puller according to some embodiments. The neck puller 1600 includes a bar 1602 for insertion into a motorcycle neck as well as one or more pulling points 1604 for coupling chains 110 (FIG. 1) to or any other mechanism for repairing the neck (e.g. by pulling the neck in one or more directions). The bar 1602 provides leverage to facilitate the pulling operation.

Figure 17:
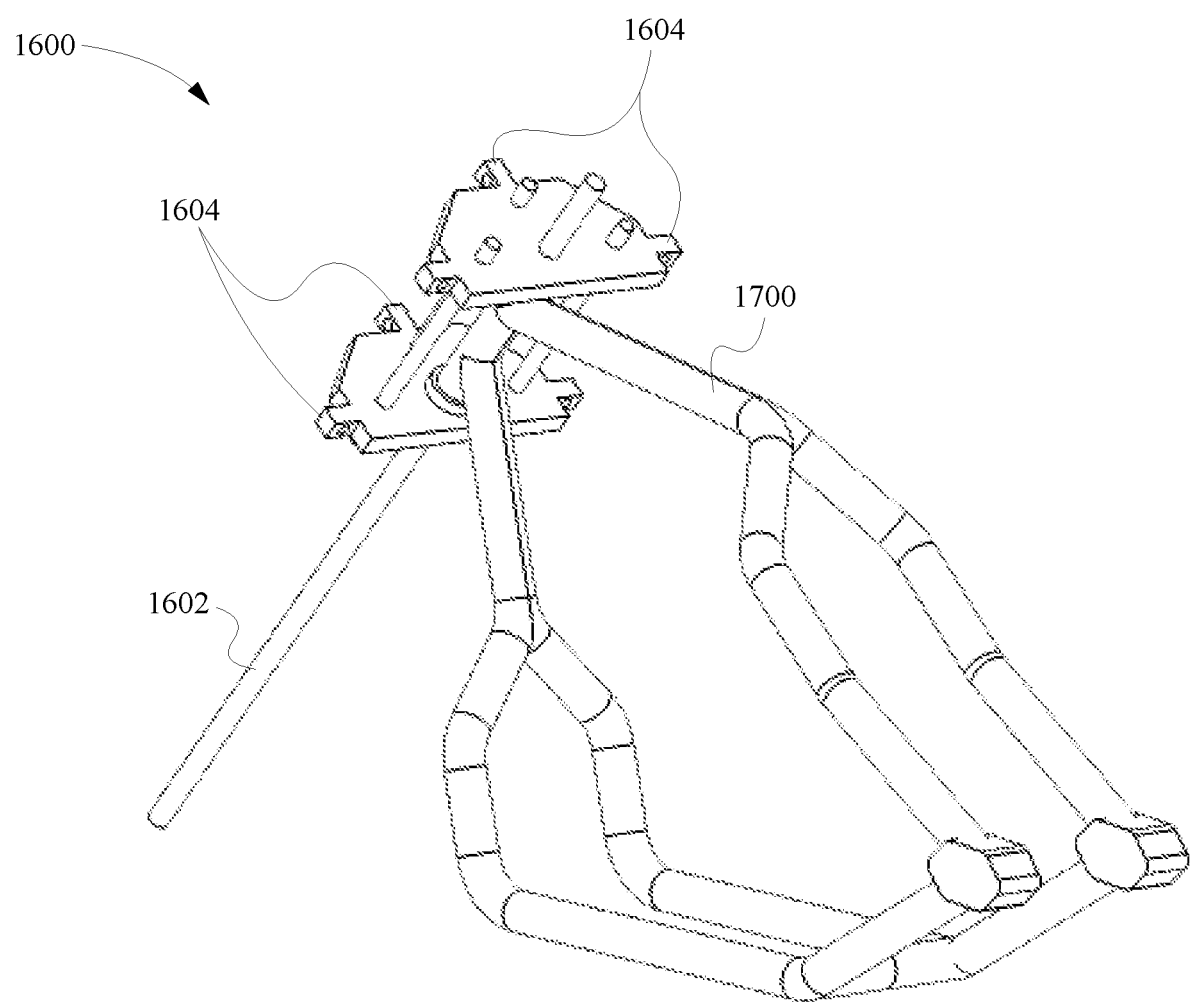
FIG. 17 illustrates a perspective view of a motorcycle frame coupled to a neck puller according to some embodiments.

FIG. 17 illustrates a perspective view of a motorcycle frame coupled to a neck puller according to some embodiments. The neck puller 1600 includes a bar 1602 for insertion into a motorcycle neck as well as one or more pulling points 1604 for coupling chains 110 (FIG. 1) to or any other mechanism for repairing the neck of the motorcycle frame 1700 (e.g. by pulling the neck in one or more directions). The bar 1602 provides leverage to facilitate the pulling operation.

Figure 18:
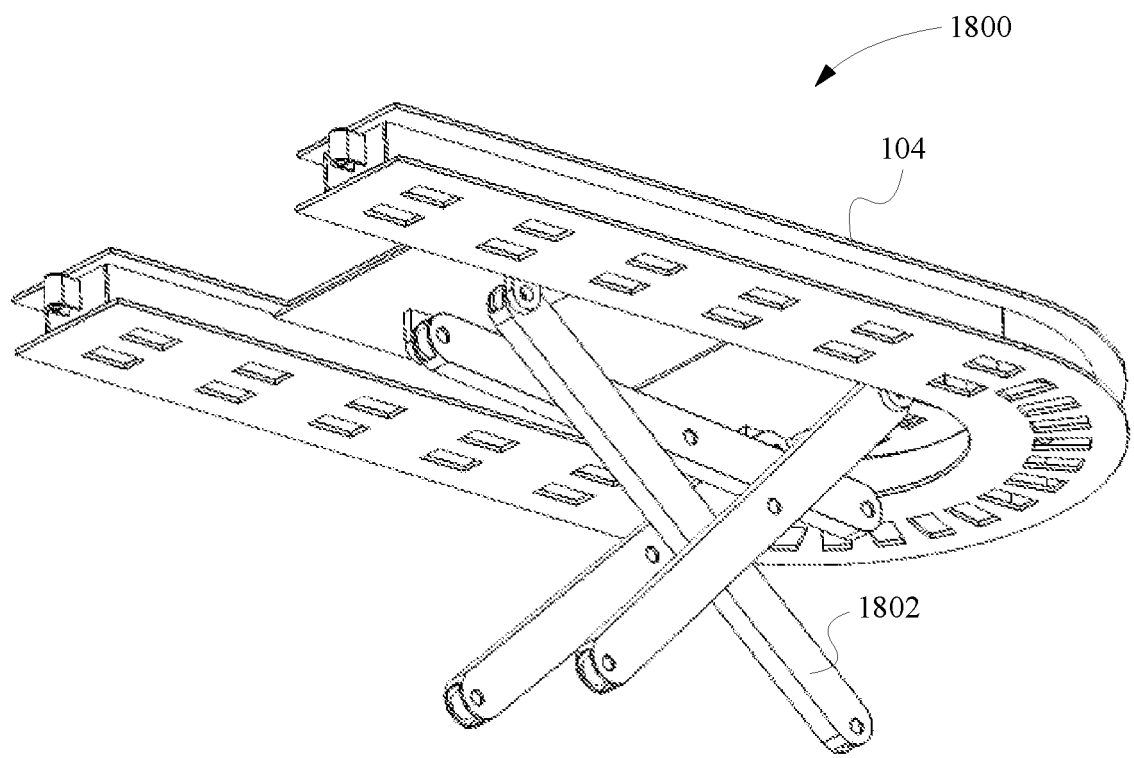
FIG. 18 illustrates a perspective view of a folding rack according to some embodiments.

FIG. 18 illustrates a perspective view of a folding rack according to some embodiments. The folding rack 1800 includes a deck 104 and any of the other components shown herein (e.g., shown in FIG. 1). The folding rack 1800 also includes folding legs 1802 which couple to the deck 104. The folding legs 1802 enable the deck 104 to be raised and lowered to a desired height such as a compact position with the deck 104 lowered completely and an extended position with the deck 104 raised at a maximum. In some embodiments, the legs 1802 are able to fit within a cavity in the deck 104.

Figure 19:
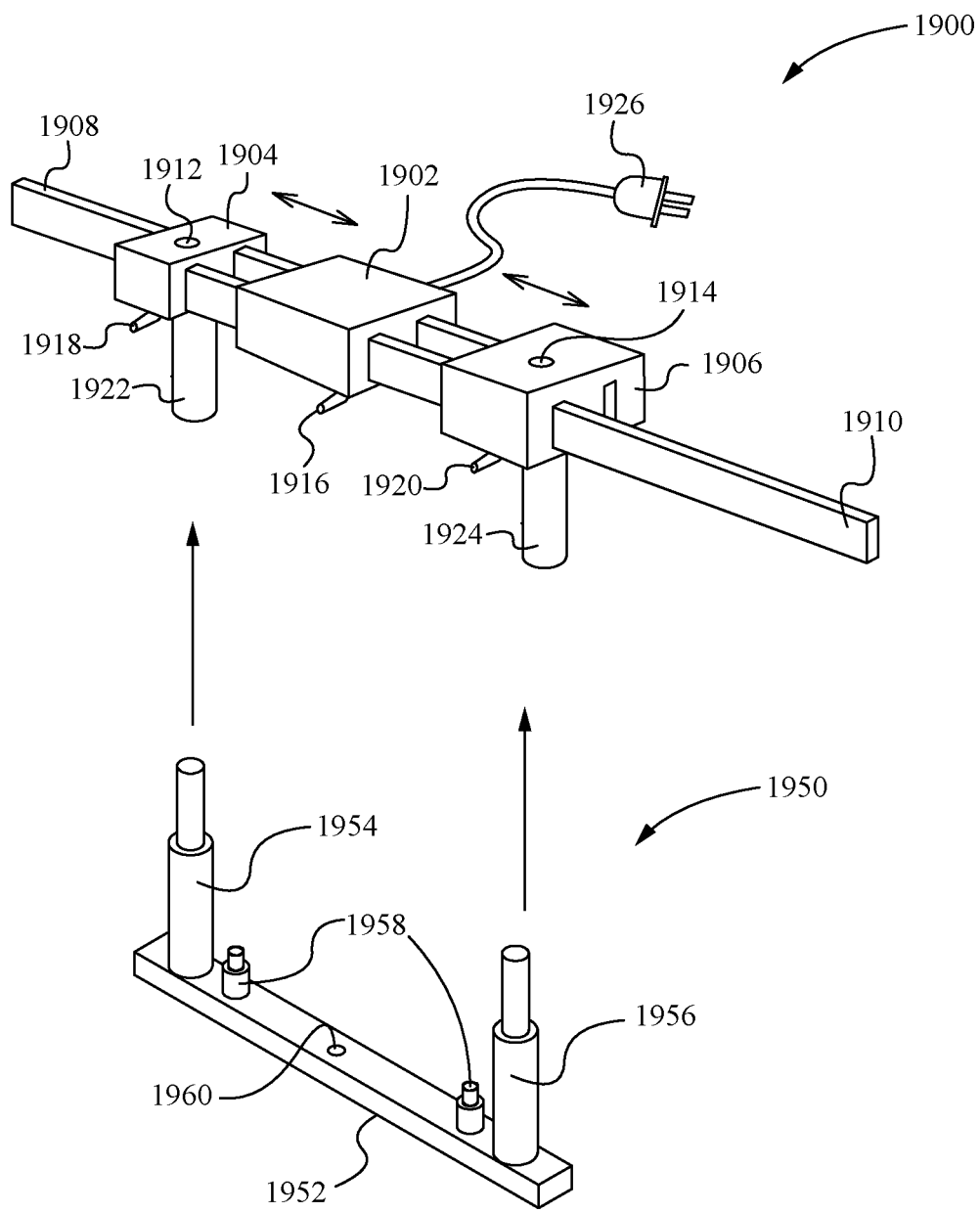
FIG. 19 illustrates a perspective view of a self-centering laser measuring system according to some embodiments.

FIG. 19 illustrates a perspective view of a self-centering laser measuring system according to some embodiments. The measuring system includes a universal mounting laser device 1900 which includes a central component 1902, a left component 1904 and a right component 1906. The central component 1902 has a first bar 1908 and a second bar 1910 passing through. The first bar 1908 passes through the left component 1904, and the second bar 1910 pass through the right component 1906. The end of the first bar 1908 ends at the right component 1906, and the end of the second bar 1910 ends at the left component 1904. The first bar 1908 and the second bar 1910 are configured to enable the left component 1904 and the right component 1906 to move toward and away from the central component 1902 equally at the same time, thus keeping the cental component 1902 an equal distance from the left component 1904 and the right component 1906 at all times. Therefore, the universal mounting laser device 1900 is self centering. In some embodiments, a mechanism or motor is contained within the central component 1902 for ensuring the left component 1904 and the right component 1906 move toward and away from the central component 1902 equally at the same time. The left component 1904 includes a first mounting hole 1912, and the right component 1906 includes a second mounting hole 1914. The mounting holes 1912, 1914 are configured to receive mounting rods 1954, 1956, respectively. The central component 1902 includes a center laser 1916, the left component 1904 includes a left laser 1918 and the right component 1906 includes a right laser 1920. The center laser 1916 is able to rotate and point to the center of the motorcycle width-wise. The left laser 1918 and the right laser 1920 are able to rotate and point to targets of the motorcycle frame. The lasers enable a user to view or measure any defects or problems with the chassis/frame (e.g., a bent frame) of the motorcycle which are then able to be corrected using the rack system described herein. A power source 1926 is included to power the lasers 1916, 1918, 1924. In some embodiments, the power source 1926 includes a cord and plug for receiving power through a power outlet, a battery (e.g., a 1A 18650 lithium ion battery with a charger), a solar cell, and/or any other power source/receiving device.

A mounting bracket 1950 is motorcycle-specific, designed/sized to fit on a specific motorcycle. For example, the mounting bracket 1950 is wider for a wider motorcycle and narrower for a narrower motorcycle. The mounting bracket includes a base 1952, a first mounting rod 1954, a second mounting rod 1956, spacers 1958 and a central point 1960. The spacers 1958 are used to mount the mounting bracket onto symmetrical mounting points on the motorcycle under the seat. The central point 1960 is able to be used to center the universal mounting laser device 1900 using the center laser 1916. As described above, the first mounting rod 1954 and the second mounting rod 1956 are used to couple the universal mounting laser device 1900 to the mounting bracket 1950 by insertion into the mounting holes 1912, 1914. The universal mounting laser device 1900 is able to expand or contract so that the mounting holes 1912 and 1914 are able to be placed on the motorcycle-specific mounting rods 1954 and 1956.

Figure 20:
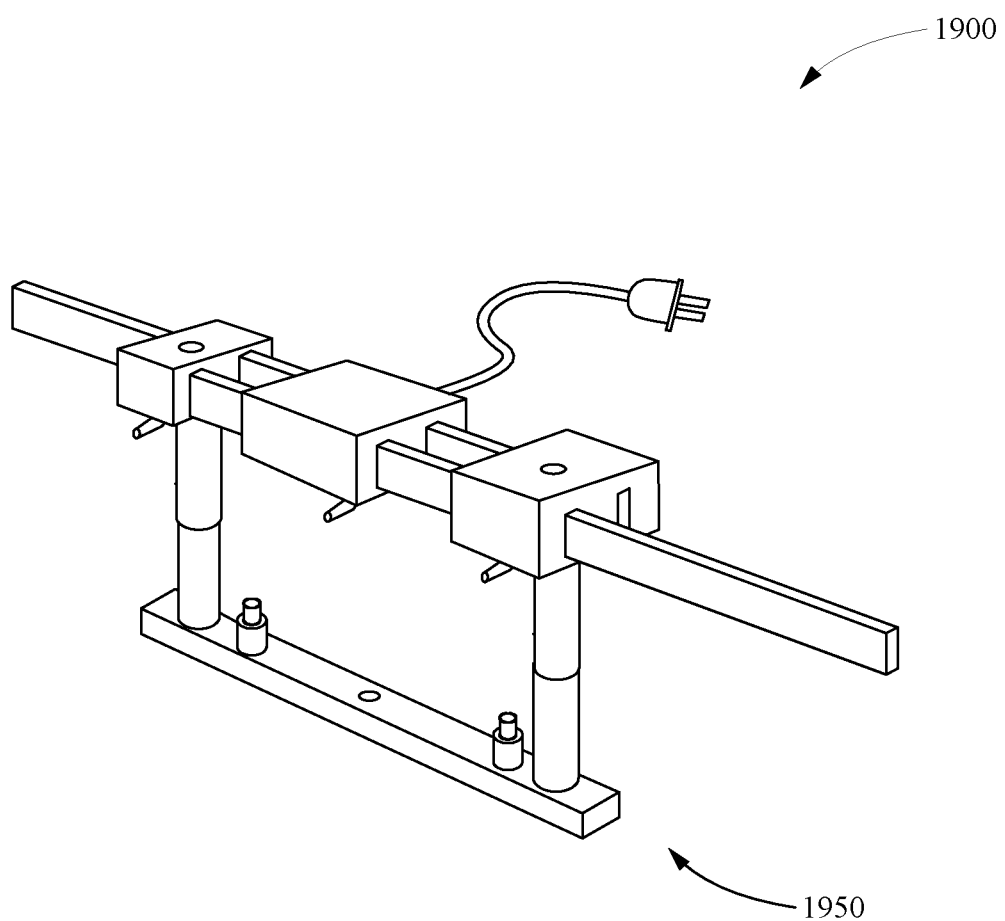
FIG. 20 illustrates a perspective view of a self-centering laser measuring system according to some embodiments.

FIG. 20 illustrates a perspective view of a self-centering laser measuring system according to some embodiments. The universal mounting laser device 1900 and the mounting bracket 1950 are shown coupled together.

Figure 21:
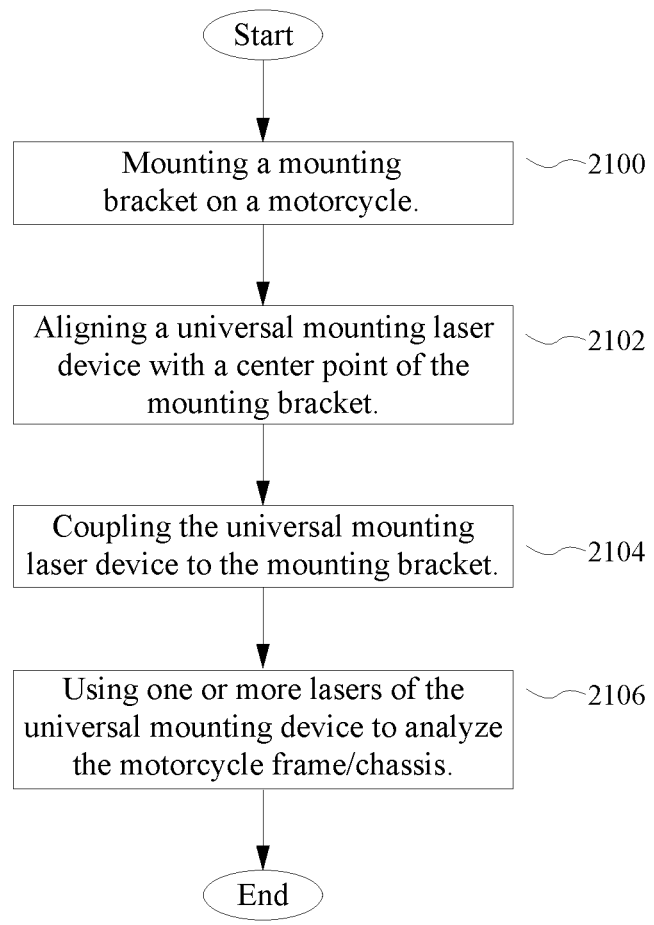
FIG. 21 illustrates a flowchart of a method of using the self-centering laser measuring system according to some embodiments.

FIG. 21 illustrates a flowchart of a method of utilizing the self-centering laser measuring system according to some embodiments. In the step 2100, a mounting bracket is mounted on a motorcycle (e.g., mounted to mounting points under a seat of the motorcycle). In the step 2102, the universal mounting laser device is lined up with the center point of the mounting bracket. In the step 2104, the universal mounting laser device is coupled to the mounting bracket by insertion of the mounting rods of the mounting bracket into mounting holes of the universal mounting laser device. The universal mounting laser device is expanded or contracted to a size so that the holes align with the mounting rods. The expansion and contraction are able to be performed by manually pulling the left and right components of the universal mounting laser device apart or pushing them together. In some embodiments, a motor automatically expands or contracts universal mounting laser device. In the step 2106, one or more lasers of the universal mounting laser device are used to analyze the motorcycle frame/chassis. The lasers are rotatable (e.g., the center laser rotates so that the laser points from the neck of the bike to the rear of the bike to detect any offsets from the center such as due to a bent frame, and the left and right lasers rotate to targets to detect any damage in the frame/chassis). In some embodiments, after the damage to the motorcycle frame/chassis is determined, the frame/chassis is repaired using the rack as described herein. The universal mounting laser device is able to be used before, during and/or after the repair process to ensure the frame/chassis is repaired properly (e.g., repaired to the original specifications). In some embodiments, fewer or more steps are implemented. In some embodiments, the order of the steps is modified.

Figure 23:
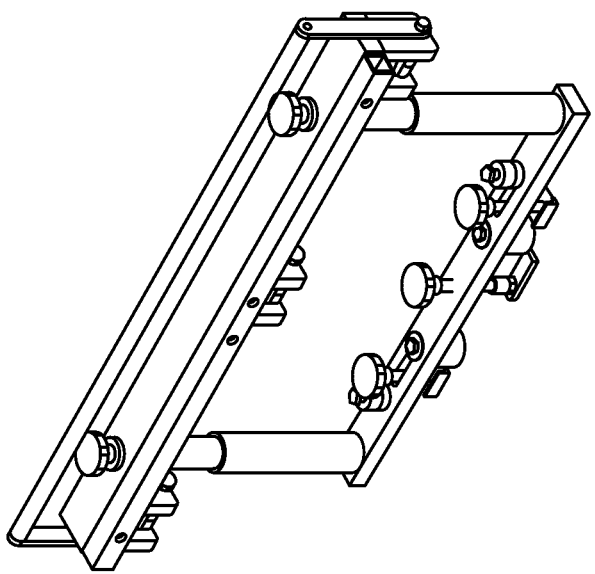
FIG. 23 illustrates a perspective view of a self-centering laser measuring system according to some embodiments.
Figure 22:
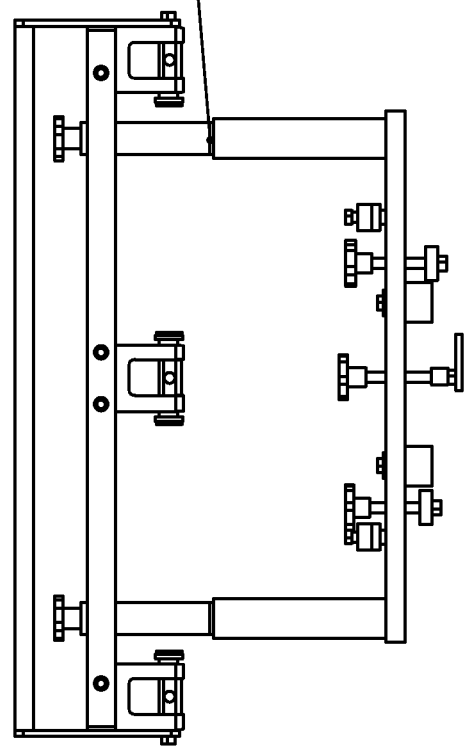
FIG. 22 illustrates a front view of a self-centering laser measuring system according to some embodiments.

FIG. 22 illustrates a front view of a self-centering laser measuring system according to some embodiments. As described herein, the self-centering laser measuring system includes multiple lasers for measuring and aligning the motorcycle frame. The laser measuring system also includes a mounting bracket which is configured to mount to a motorcycle. The mounting device is configured to couple with a self-centering laser device. FIG. 23 illustrates a perspective view of a self-centering laser measuring system according to some embodiments.

Figure 24:
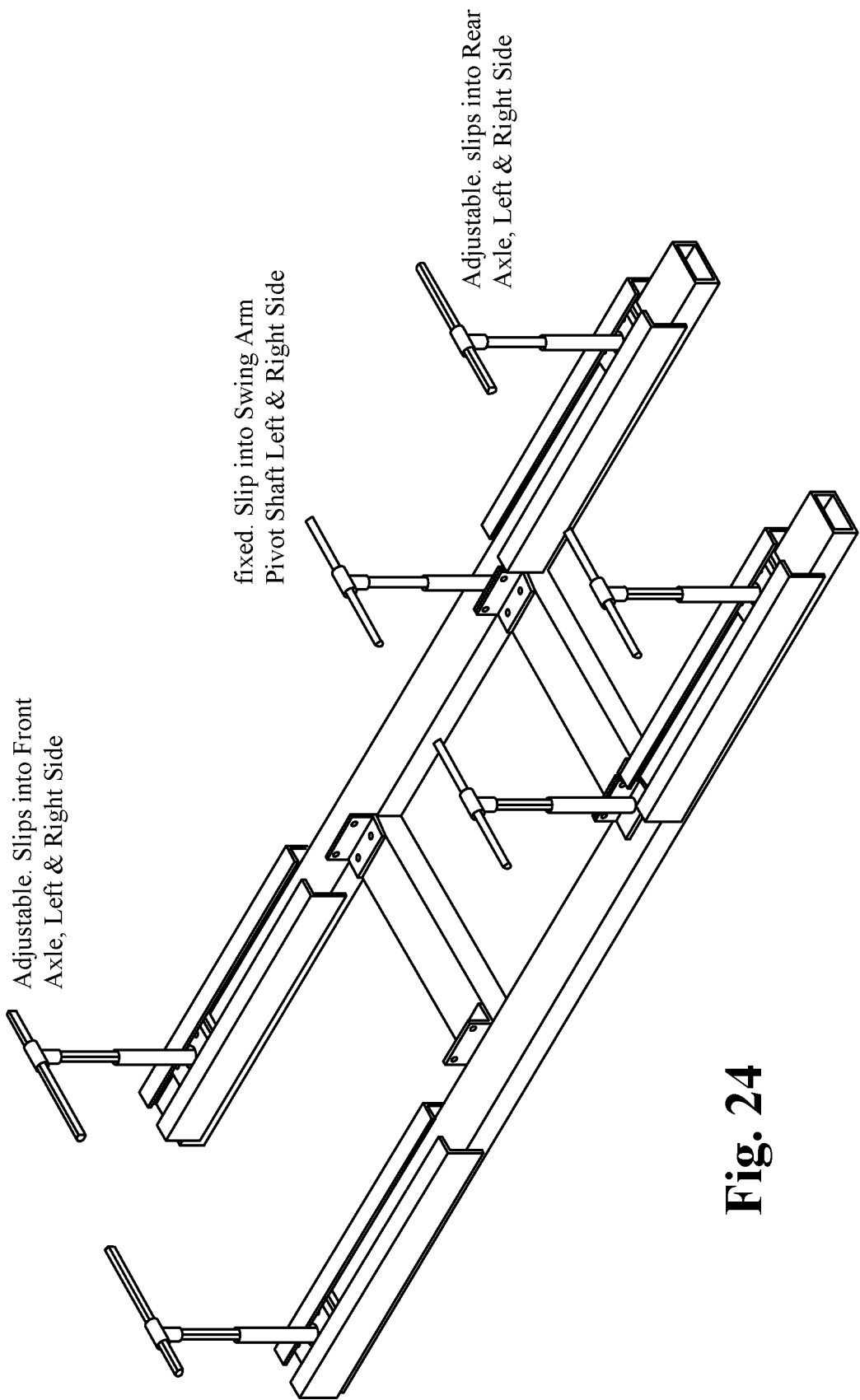
FIG. 24 illustrates a perspective view of an alignment system according to some embodiments.

FIG. 24 illustrates a perspective view of an alignment system according to some embodiments. The alignment system includes a pair of front end bars which are adjustable and are configured for insertion into a front axle from the left and right side. The front end bars are configured perpendicular to vertical rods which are positioned on a track within the front of a base structure. The alignment system also includes a pair of fixed bars which fit into the swing arm pivot shaft and two rear adjustable arms which fit on/in the rear axle of a motorcycle. The fixed bars are also on the left and right side, and are coupled to the base structure. A pair of rear end bars are included with the alignment system. The rear end bars are adjustable and are configured for insertion into a rear axle from the left and right side. The rear end bars are configured perpendicular to vertical rods which are positioned on a track within the rear of the base structure. The alignment system is able to measure the height and length from front to rear on the left and right side on the motorcycle at axles and pivot points to ensure proper alignment. There are measurement scales on each adjustable bar and fixed bar to achieve the same dimensions in length and height on the left and right side of a motorcycle. The alignment system is able to be used on the ground as a stand-alone device. The alignment system is able to be used with the rack described herein. The alignment system is able to be used with any motorcycle service lift.

Figure 25:
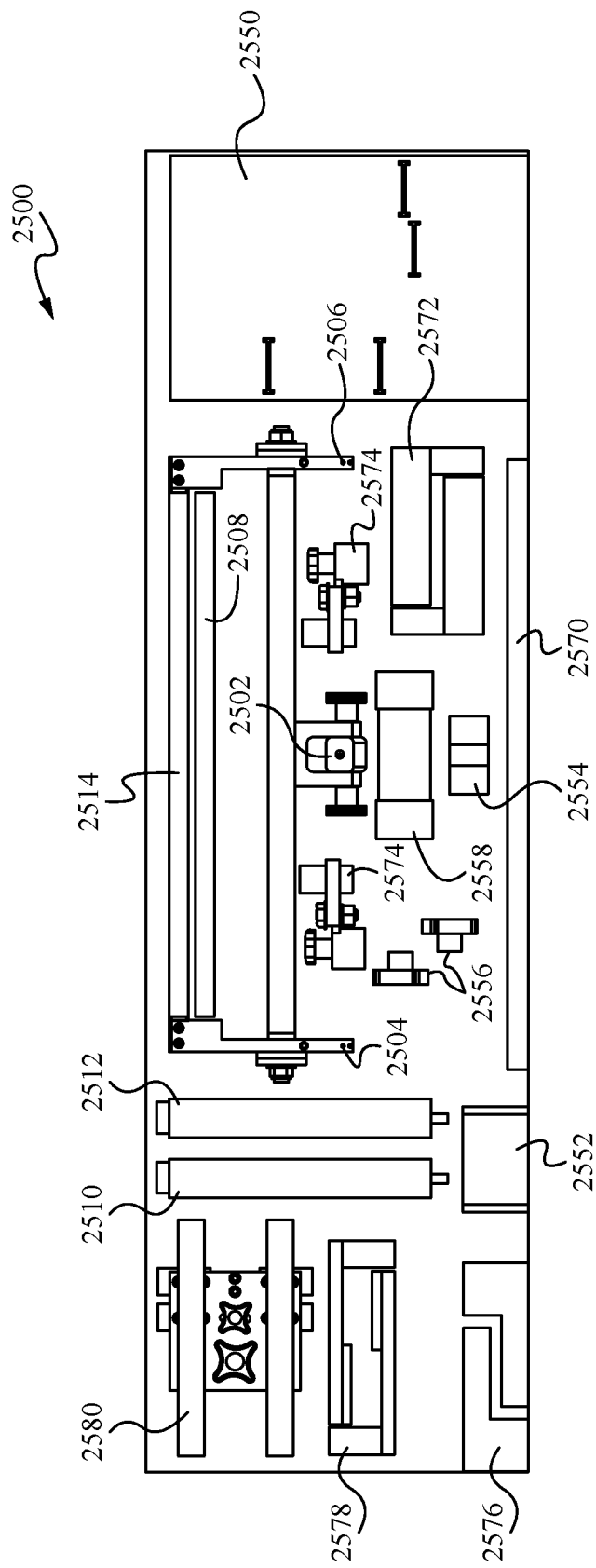
FIG. 25 illustrates a front view of components of a laser measuring system according to some embodiments.

FIG. 25 illustrates a front view of components of a laser measuring system according to some embodiments. The laser measuring system 2500 is similar to the laser measuring system of FIGS. 22 and 23. The laser measuring system 2500 includes a center laser 2502, a first outer laser 2504 and a second outer laser 2506. The laser measuring system 2500 also includes a lower laser bar 2508, a first vertical laser bar mounting rod 2510, a second vertical laser bar mounting rod 2512 and a laser mounting bar 2514.

Also included with the laser measuring system 2500 are additional components such as a box 2550 for mounting brackets, targets and hardware, a battery charger 2552 for a cordless implementation, a tape measure 2554, mounting knobs 2556, and center triple tree targets, hardware and container 2558.

In some embodiments, there are specialized measuring mounts to measure the neck, shock mounts, swing arm, and frame mounts of the frame to determine if the frame is bent such as a validation bar 2570 for softtails and swingarm shocks, upper shock mount validation brackets 2572, one or more swing arm target mounts 2574, Delrin mounting spacers 2576 for the lower laser mounting bar, softtail side mount validation brackets 2578 and a universal neck target mounting system 2580.

Figure 26:
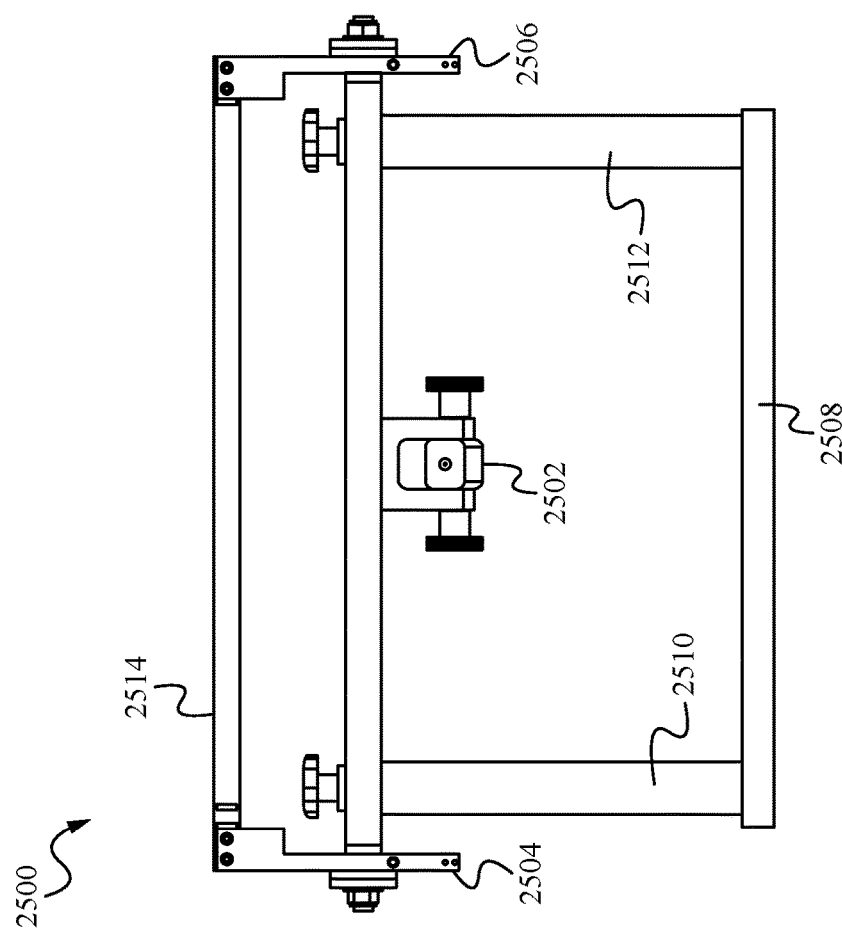
FIG. 26 illustrates a front view of a laser measuring system according to some embodiments.

FIG. 26 illustrates a front view of a laser measuring system according to some embodiments. The laser measuring system 2500 includes a center laser 2502, a first outer laser 2504 and a second outer laser 2506. In some embodiments, fewer or additional lasers are implemented. The laser measuring system 2500 also includes a lower laser bar 2508 which mounts to the center of any motorcycle with various mounting brackets designed to mount to a specific motorcycle. A first vertical laser bar mounting rod 2510 and a second vertical laser bar mounting rod 2512 are utilized to mount the laser mounting bar 2514. For example, the laser mounting bar 2514 couples to the lower laser bar 2508 with the first vertical laser bar mounting rod 2510 and the second vertical laser bar mounting rod 2512. The center laser 2502 is positioned in the horizontal center of the laser mounting bar 2514. On the sides of the laser mounting bar 2514 are the first outer laser 2504 and the second outer laser 2506. In some embodiments, the laser mounting bar 2514 includes a handle which rotates the outer lasers 2504, 2506 from the front to the rear of the motorcycle, and a second bar which includes the center laser 2502 and couples to the lower laser bar 2508 with the first vertical laser bar mounting rod 2510 and the second vertical laser bar mounting rod 2512. For example, when a user pushes the handle forward the outer lasers 2504, 2506 move backward. In some embodiments, the handle rotates the outer lasers 2504, 2506 from the rear to the front of the motorcycle. In some embodiments, the center laser 2502 rotates from the front to the rear of the motorcycle independent of the outer lasers 2504, 2506 using knobs on the left and/or right side of the center laser housing (or other implementations to rotate the center laser 2502). In some embodiments, the center laser 2502 moves based on the movement of the handle or independently of the handle (e.g., the laser is rotatable by pushing the laser). In some embodiments, any of the lasers are movable using motorized capabilities, for example, a motor is contained within the laser mounting bar 2514 with the appropriate hardware (e.g., gears, cables, joints, hinges) to rotate the lasers. The two outer laser dots hit various targets with scales mounted to the motorcycle, and the center laser points to the center of the motorcycle frame to validate the frame is straight and suspension is aligned. In some embodiments, the laser measuring system 2500 is corded, and in some embodiments, the laser measuring system 2500 is cordless. For example, the laser measuring system 2500 includes a removable battery pack in the laser mounting bar 2514.

Figure 27:
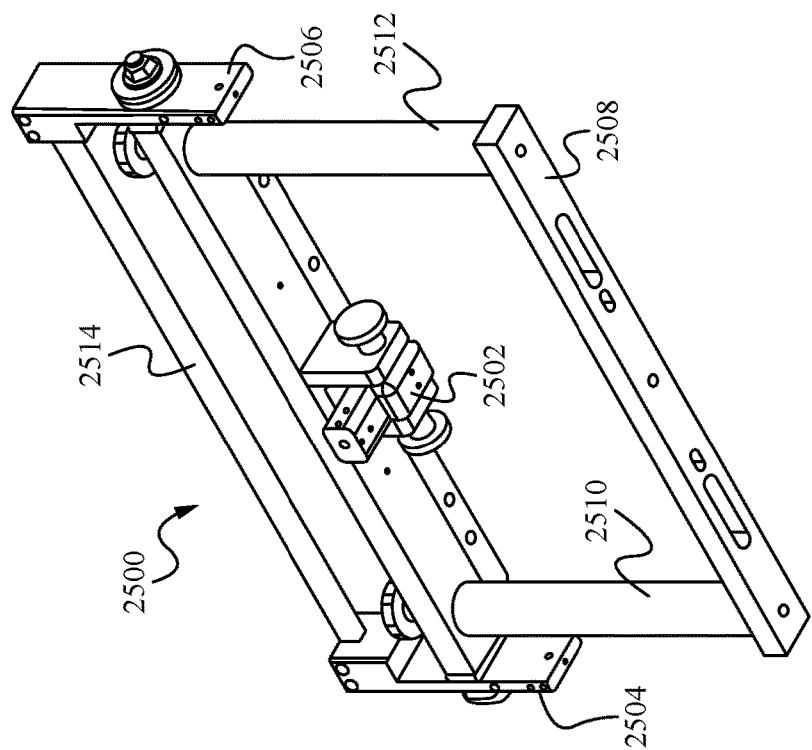
FIG. 27 illustrates a bottom perspective view of a laser measuring system according to some embodiments.

FIG. 27 illustrates a bottom perspective view of a laser measuring system according to some embodiments. As described herein, the laser measuring system 2500 includes a center laser, a first outer laser 2504 and a second outer laser 2506 which are positioned appropriately on a laser mounting bar 2514. A lower laser bar 2508 mounts to a motorcycle and couples to the laser mounting bar 2514 using a first vertical laser bar mounting rod 2510 and a second vertical laser bar mounting rod 2512. Any of the mounting implementations described herein are able to be used to mount the laser measuring system 2500 to the motorcycle. For example, several components of the laser measuring system 2500 are universal which couple to motorcycle-specific components.

The laser measuring system and the self-centering laser measuring systems are able to be utilized as stand alone measuring systems, and are able to be used in conjunction with a motorcycle frame repair system (e.g., the rack) for motorcycle frame repair).

Although a motorcycle frame has been described as being repaired using the rack, any device is able to be repaired such as a moped or a scooter.

To utilize the motorcycle frame rack, a motorcycle is positioned on the rack in a universal mounting system. The damage to the frame is determined using a measuring system. Then, chains coupled to towers are coupled to the frame which adjust the frame to the frame's original configuration or at least approximately the original configuration by pulling the frame at the appropriate points and angles.

In operation, the motorcycle frame rack reduces the time and cost of repairing a motorcycle frame by enabling a frame to be repaired without requiring the motorcycle to be taken apart.

Examples of suitable computing devices to be used with the motorcycle frame rack include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad or any other suitable computing device.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A laser measuring device for measuring a motorcycle frame comprising:
   a. a central laser;
   b. a plurality of outer lasers; and
   c. a frame to which the central laser and the plurality of outer lasers are attached, the frame configured for coupling to a motorcycle, wherein the central laser and the plurality of outer lasers are configured to measure at least one of a height and a length from front to rear on a left side and a right side of the frame at one or more axles and one or more pivot points of the motorcycle, wherein the plurality of outer lasers move equidistantly towards or away from the central laser.

2. The laser measuring device of claim 1 wherein the frame comprises a plurality of side components and a central component, wherein the plurality of side components move equidistantly towards or away from the central component.

3. The laser measuring device of claim 1 wherein the frame includes a handle which rotates the plurality of outer lasers from the front of the motorcycle to the rear of the motorcycle.

4. The laser measuring device of claim 1 wherein the frame includes a handle which rotates the central laser from the front of the motorcycle to the rear of the motorcycle.

5. The laser measuring device of claim 1 wherein the frame couples with a bar to couple to the motorcycle.

6. The laser measuring device of claim 5 wherein the bar couples with a motorcycle-specific bracket to couple to the motorcycle.

7. A method of utilizing a laser measuring system comprising:
   a. mounting a mounting bracket to a motorcycle;
   b. aligning a universal mounting laser device with a center point of the mounting bracket;
   c. coupling the universal mounting laser device to the mounting bracket; and
   d. measuring at least one of a height and a length from front to rear on a left side and a right side of a frame at one or more axles and one or more pivot points of the motorcycle using the universal mounting laser device, wherein the universal mounting laser device includes a central laser and a plurality of outer lasers, wherein the plurality of outer lasers move equidistantly towards or away from the central laser.

8. The method of claim 7 wherein mounting the mounting bracket to the motorcycle includes mounting the mounting bracket to mounting points under a seat of the motorcycle.

9. The method of claim 7 wherein coupling the universal mounting laser device to the mounting bracket is by inserting mounting rods of the mounting bracket into mounting holes of the universal mounting laser device.

10. The method of claim 7 wherein using the universal mounting laser device to analyze the motorcycle frame includes measuring defects in the motorcycle frame.

11. The method of claim 7 wherein using the universal mounting laser device to analyze the motorcycle frame includes aiming the lasers at targets of the motorcycle frame.

12. The method of claim 7 further comprising adjusting the motorcycle frame with a rack.

13. The method of claim 7 further comprising using the universal mounting laser device to re-analyze the motorcycle frame to ensure any damage has been corrected.

14. The method of claim 7 further comprising rotating the universal mounting laser device using a handle of the universal mounting laser device.

15. A self-centering laser measuring device comprising:
   a. a universal mounting laser device configured for measuring a motorcycle frame, wherein the universal mounting laser device comprises:
      i. a central laser;
      ii. a plurality of additional lasers; and
      iii. one or more coupling mechanisms for coupling the plurality of additional lasers with the central laser, wherein the central laser and the plurality of additional lasers are configured to measure at least one of a height and a length from front to rear on a left side and a right side of the motorcycle frame at one or more axles and one or more pivot points of a motorcycle, wherein the plurality of additional lasers move equidistantly towards or away from the central laser; and
   b. a mounting bracket configured for coupling to the motorcycle.

16. The self-centering laser measuring device of claim 15 wherein a plurality of side components move equidistantly towards or away from a central component.

17. The self-centering laser measuring device of claim 16 wherein the central laser is rotatable.

18. The self-centering laser measuring device of claim 16 wherein each side component of the plurality of side components includes an aperture for receiving a mounting rod.

19. The self-centering laser measuring device of claim 16 wherein the one or more coupling mechanisms comprise:
   i. a first bar coupled to an end of a first side component of the plurality of side components, wherein the first bar passes through the central component and a second side component of the plurality of side components; and ii. a second bar coupled to an end of the second side component of the plurality of side components, wherein the second bar passes through the central component and the first side component of the plurality of side components.

20. The self-centering laser measuring device of claim 15 wherein the plurality of additional lasers are configured to point to targets of a motorcycle frame.

21. The self-centering laser measuring device of claim 15 wherein the mounting bracket is configured for a specific motorcycle.

22. The self-centering laser measuring device of claim 15 wherein the mounting bracket comprises:
   i. a base;
   ii. a central point on the base;
   iii. a plurality of mounting rods; and
   iv. a plurality of spacers.

* * * * *